(12) United States Patent
Sun et al.

(10) Patent No.: US 7,508,607 B2
(45) Date of Patent: Mar. 24, 2009

(54) OPTICAL FILM

(75) Inventors: Hsun-Ming Sun, Taichung (TW);
Fang-I Chang, Taichung County (TW)

(73) Assignee: Wintek Corporation, Taichung (TW)

( * ) Notice: Subject to any disclaimer, the term of this patent is extended or adjusted under 35 U.S.C. 154(b) by 324 days.

(21) Appl. No.: 11/438,292

(22) Filed: May 23, 2006

(65) Prior Publication Data

US 2006/0268437 A1 Nov. 30, 2006

(30) Foreign Application Priority Data

May 24, 2005 (TW) ............... 94116969 A

(51) Int. Cl.
*G02B 5/04* (2006.01)
(52) U.S. Cl. ..................... 359/831
(58) Field of Classification Search .......... 359/831–837
See application file for complete search history.

(56) References Cited

U.S. PATENT DOCUMENTS 4,799,137 A * 1/1989 Aho ............ 359/834

4,823,246 A * 4/1989 Dilouya ............ 362/328

FOREIGN PATENT DOCUMENTS

| JP | 08-240805 | 9/1996 |
|---|---|---|
| KR | 2001-0048770 | 6/2001 |
| KR | 2003-0089912 | 11/2003 |
| TW | M247837 | 10/2004 |

* cited by examiner

*Primary Examiner*—Euncha P Cherry
(74) *Attorney, Agent, or Firm*—Bacon & Thomas, PLLC

(57) ABSTRACT

An optical film includes a first film member, a second film member and a connecting member integrally joining the first film member and the second film member. The first film member has a first structured surface and a first opposing surface. The second film member is located below the first film member. The second film member has a second structured surface and a second opposing surface. The second structured surface of the second film member is attached to the first opposing surface of the first film member.

22 Claims, 11 Drawing Sheets

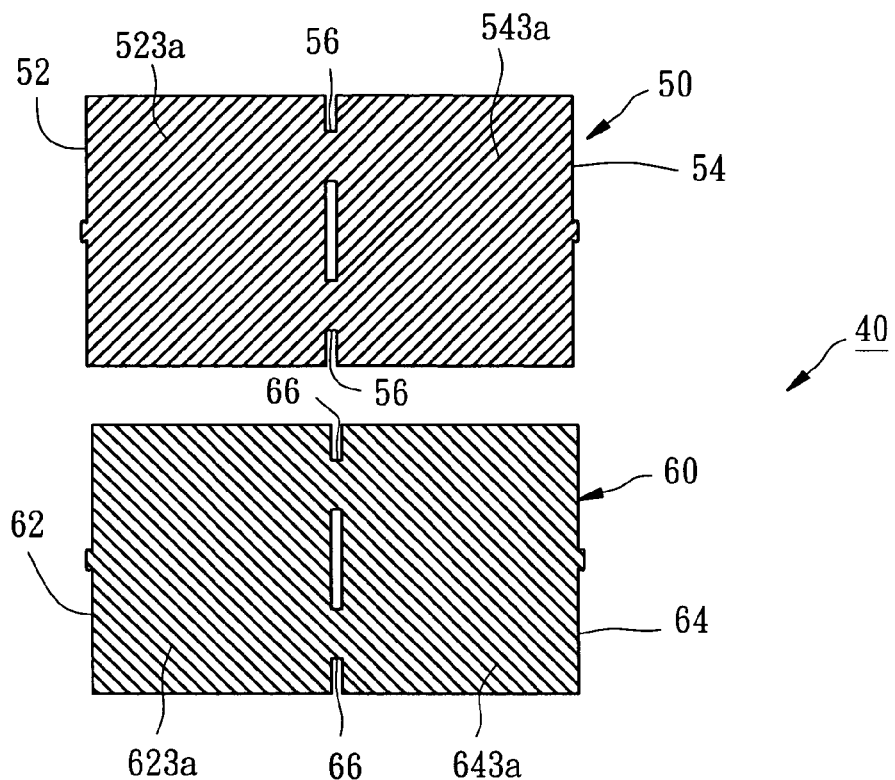
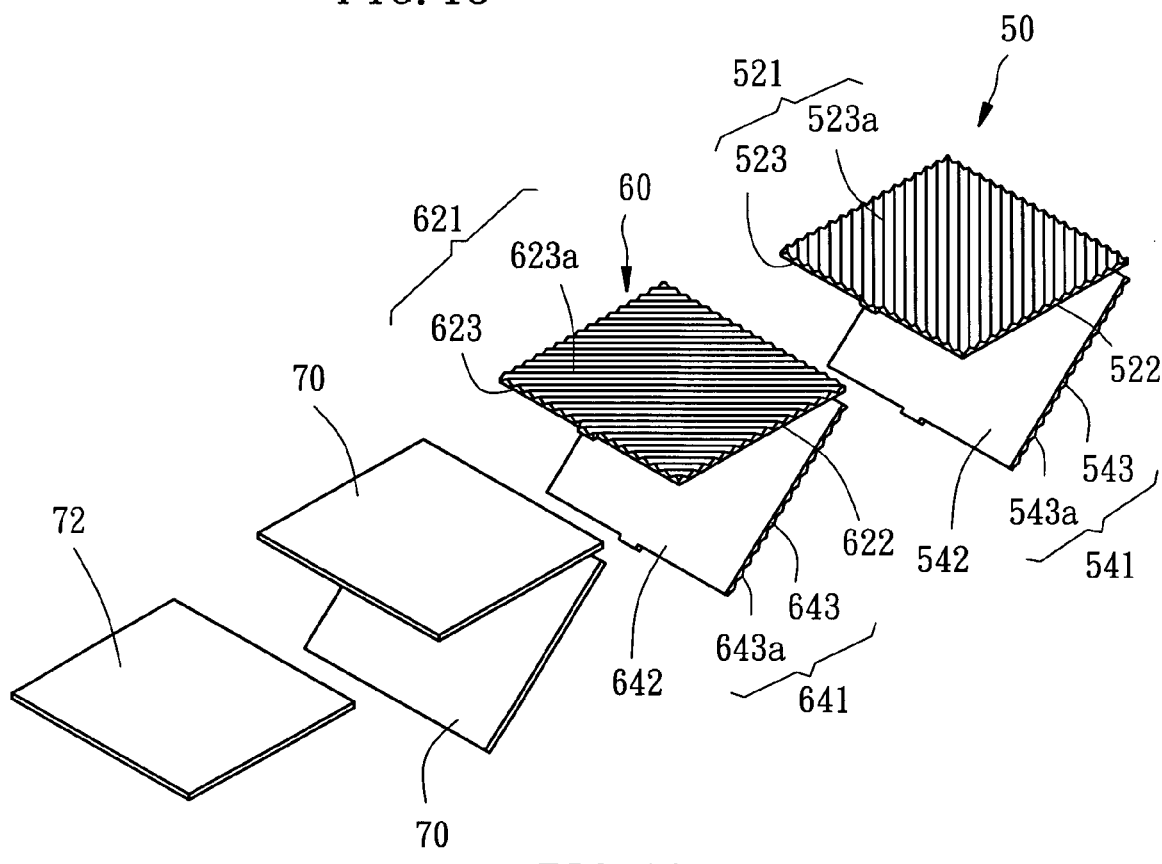

OPTICAL FILM

BACKGROUND OF THE INVENTION

1. Field of the Invention

The present invention relates to a backlight module for optical display and more particularly, to an optical film for backlight modules that can concentrate light rays and enhance the luminance.

2. Description of the Related Art

An optical film is a fine structure commonly used to enhance the luminous efficiency. However, when using an optical film, the mounting order and the orientation of the optical film must be carefully controlled. Improper installation causes the optical film unable to carry out the effect.

FIG. 1 is an exploded view of a backlight module using optical films such as brightness enhancement films (hereinafter referred as "BEFs"). As illustrated, the backlight module comprises a light guide plate 1, a diffuser 2, two BEFs 3 and 4. The light guide plate 1 fogs a linear light source into a uniform area light source. The diffuser 2 is covered on the top side of the light guide plate 1 to diffuse light rays evenly. The two BEFs 3 and 4 are arranged in proper order on the top side of the diffuser 2, each having parallel prisms 3a or 4a that condense light rays to enhance the luminous efficiency of the light guide plate 1 and to further enhance the luminance of the backlight module.

To ensure high performance of the two BEFs 3 and 4, the side of the first BEF 3 carrying the prisms 3a and the side of the second BEF 4 carrying the prisms 4a must face the same direction during installation, and the prism extending direction of the first BEF 3 must define with the prism extending direction of the second BEF 4 a contained angle. Preferably, the prism extending direction of the first BEF 3 and the prism extending direction of the second BEF 4 are arranged at right angles.

However, because the BEFs 3 and 4 are two separated members, they are arranged one above the other on the diffuser 2 in proper order. During the assembly process, the operator may attach the two BEFs 3 and 4 back to back erroneously or have the prism extending direction of the first BEF 3 and the prism extending direction of the second BEF 4 be arranged in parallel. When one of these mistakes occurred, the backlight module must be dismounted and reworked, thereby complicating the assembly process and increasing the work time.

SUMMARY OF THE INVENTION

The present invention has been accomplished under the circumstances in view. It is the primary objective of the present invention to provide an optical film, which has two films that can concentrate light rays and enhance luminance made connected together for quick installation without error, so as to shorten the installation time and to improve the working efficiency.

To achieve this objective of the present invention, the optical film provided by the present invention comprises a first film member, a second film member and a connecting member integrally joined with the first film member and the second film member. The first film member comprises a first structured surface and a first opposing surface. The second film member is located below the first film member, comprising a second structured surface and a second opposing surface. The second structured surface of the second film member is attached to the first opposing surface of the first film member. The connecting member has a first end connected to the first film member and a second end connected to the second film member.

BRIEF DESCRIPTION OF THE DRAWINGS

FIG. 18 is a schematic drawing showing an optical film set formed of a first optical film and a second optical film according to the present invention.

FIG. 19 is an exploded view showing the optical film set of FIG. 18 used in a dual screen optical display.

DETAILED DESCRIPTION OF THE INVENTION

Figure 1:
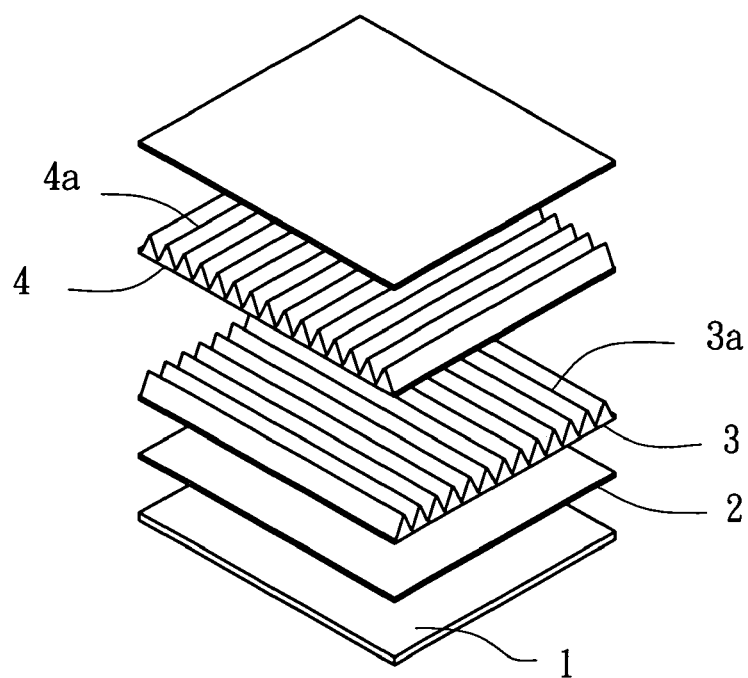
FIG. 1 is an exploded view showing the basic structure of a backlight module according to the prior art.
Figure 2:
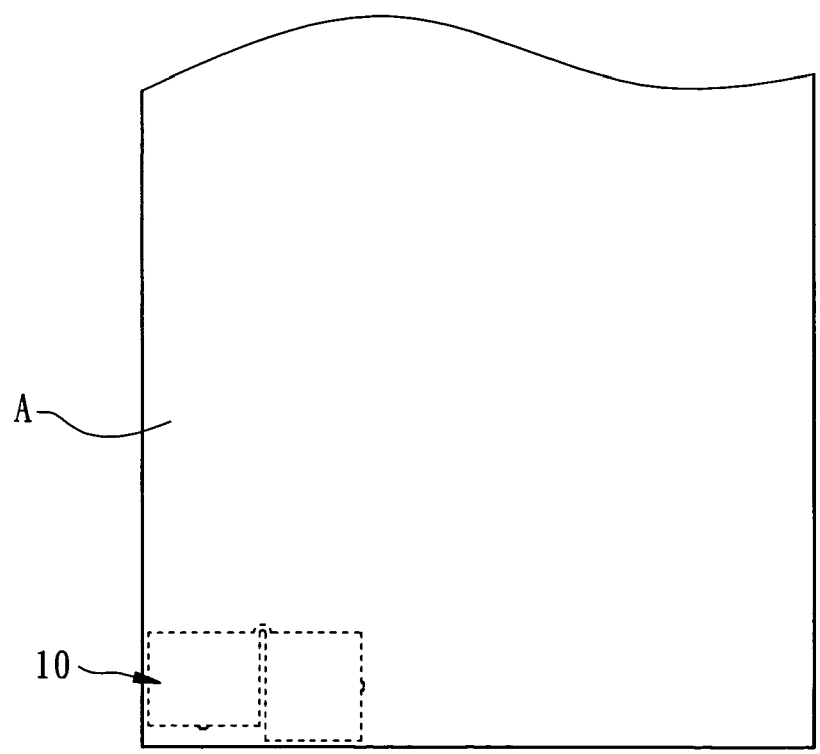
FIG. 2 is a schematic drawing showing an optical film material selected according to the present invention.
Figure 3:
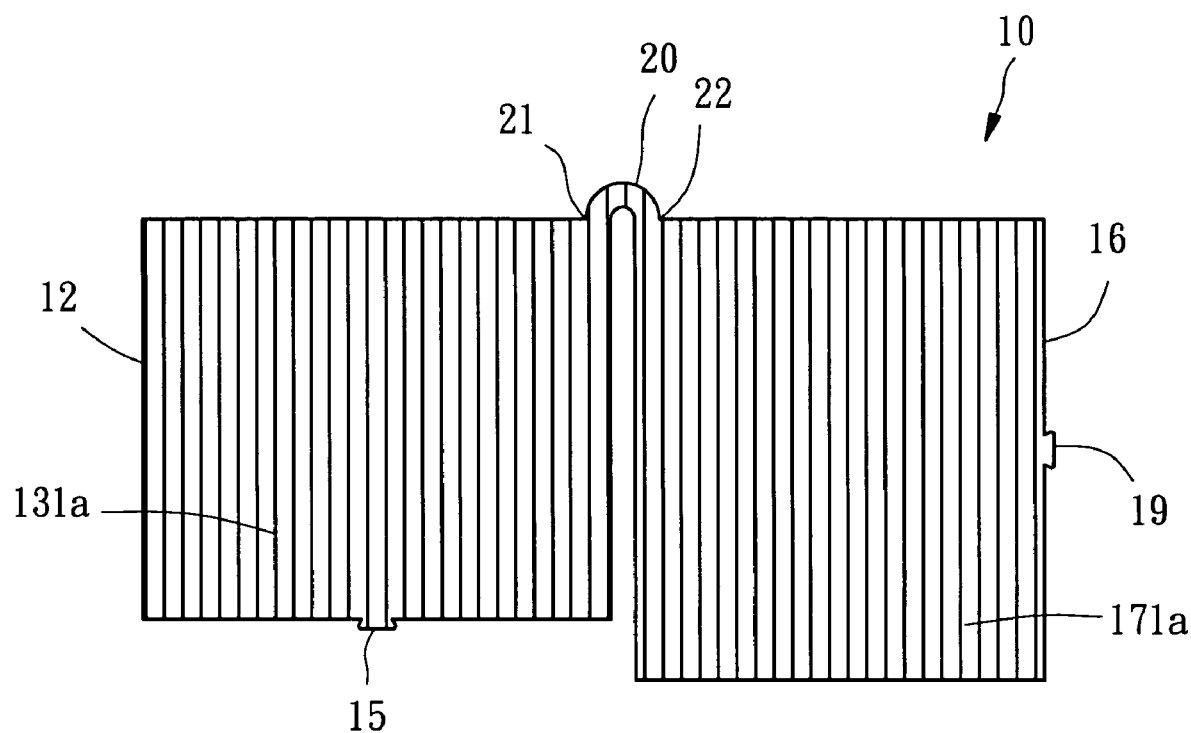
FIG. 3 is a schematic drawing showing an optical film cut from the material shown in FIG. 2.
Figure 4:
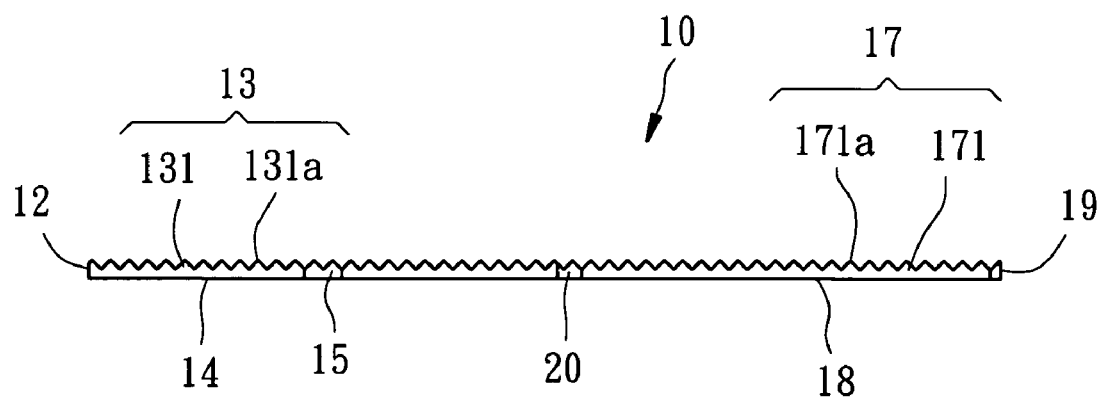
FIG. 4 is a front view of FIG. 3.

Referring to FIGS. 2-4, an optical film 10 in accordance with the first embodiment of the present invention is directly cut from a material A through one single cut, comprising a first film member 12, a second film member 16 and a connecting member 20 connected between and formed integral with the first film member 12 and the second film member 16.

The first film member 12 is a rectangular member, having a first structured surface 13, a first opposing surface 14, and a first protruding portion 15. The first structured surface 13 comprises a first optical structure having a plurality of linear prisms 131. The ridges 131a of the linear prisms 131 extend in a straight parallel manner. The first protruding portion 15 extends outwards from one long side of the first film member 12.

The second film member 16 is a rectangular member, having a second structured surface 17, a second opposing surface 18, and a second protruding portion 19. The second structured surface 17 comprises a second optical structure having a plurality of linear prisms 171. The ridges 171a of the linear prisms 171 extend in a straight parallel manner. The second protruding portion 19 extends outwards from one long side of the second film member 16. The first and second protruding portions 15 and 19 are not at the same side.

The connecting member 20 is an arched member having a first end 21 and a second end 22. As shown in FIG. 3, the first end 21 is connected to a corner of the first film member 12, and the second end 22 is connected to a corner of the second film member 16.

As stated above, the optical film 10 has a plurality of linear prisms 131 and 171. When light passes from the first and second opposing surfaces 14 and 18 through the linear prisms 131 and 171 of the optical film 10, a light condensing effect is produced. Therefore, the optical film 10 is also called as brightness enhancement film or prism sheet practical for use in a backlight module.

Figures 5, 6:
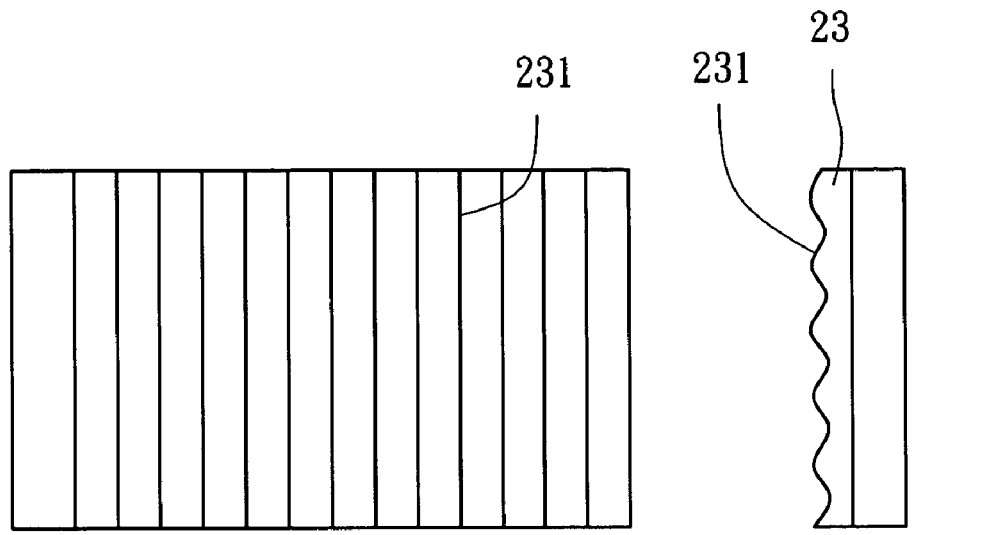
FIGS. 5 and 6 show the curved extending status of the ridges of the prisms according to the present invention.
Figure 7:
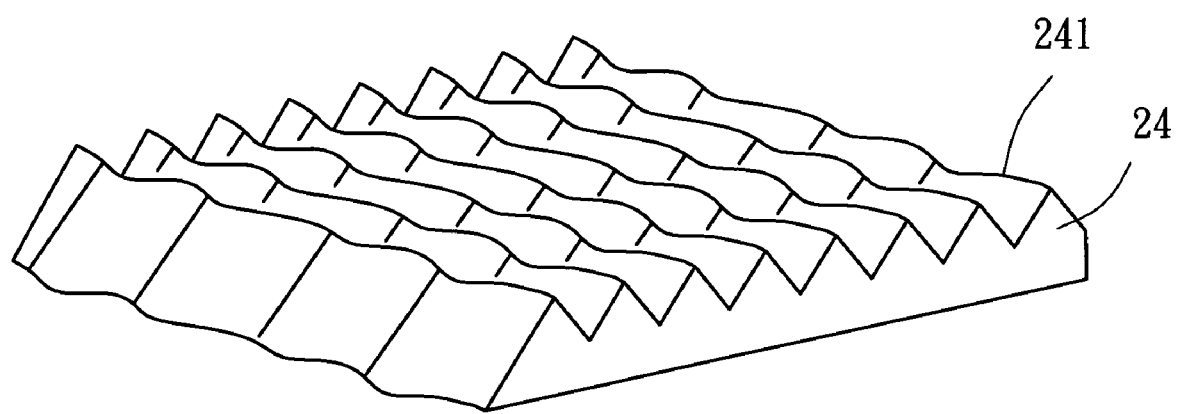
FIGS. 7-10 show the equal height status of the prisms and the wavelike extending status of the ridges of the prisms according to the present invention.
Figure 8:
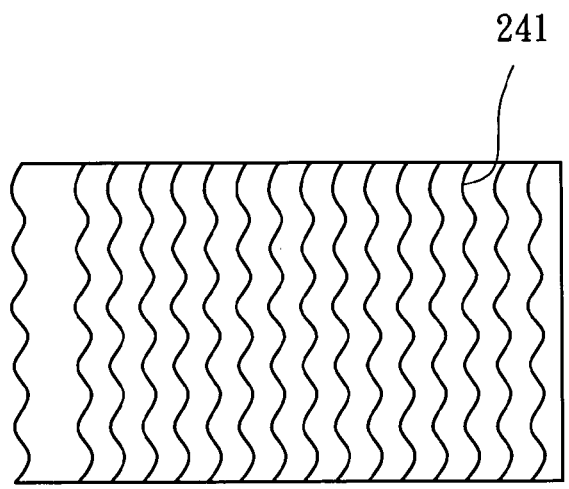
Figure 9:
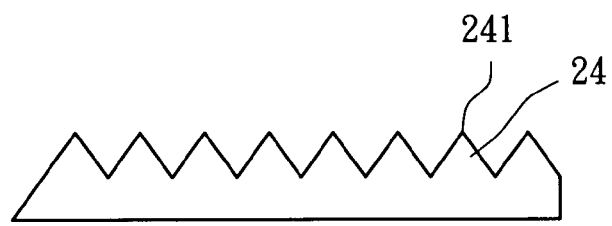
Figure 10:
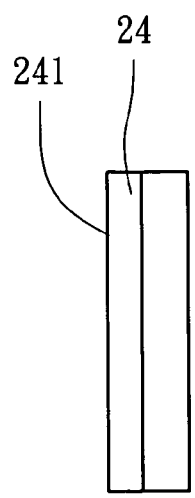

According to the embodiment shown in FIGS. 3 and 4, the linear prisms are of the same height and straightly extend in the predetermined direction. However, these prisms can be various embodied. FIGS. 5 and 6 show an alternate form of the prisms. According to this embodiment, the ridges 231 of the prisms 23 extend straightly in a parallel relationship when viewed from the top side (see FIG. 5); however, the ridge 231 of each prism 23 is shown curved up and down when viewed from one lateral side, as shown in FIG. 6. FIGS. 7-10 show another alternate form of the prisms. According to this embodiment, the prisms 24 are curved prisms arranged in parallel. When viewed from the top side, as shown in FIG. 8, the ridges 241 of the prisms 24 extend in a waved parallel pattern. However, the ridges 241 of the prisms 24 are of the same height, as shown in FIGS. 9 and 10.

The installation of the optical film 10 is outlined hereinafter. As stated above, the optical film 10 is directly cut from the material A through one single cut (see FIGS. 3 and 4). Therefore, the first structured surface 13 of the first film member 12 and the second structured surface 17 of the second film member 16 face the same direction before installation.

Figure 11:
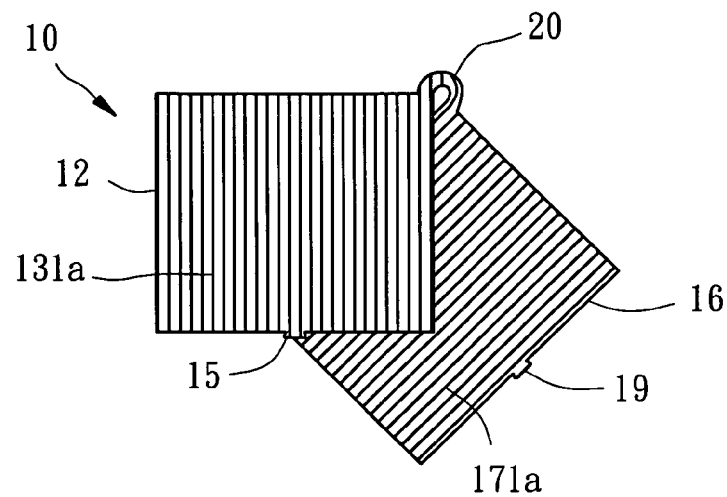
FIG. 11 is a schematic drawing showing the connecting member of the optical film twisted, the first film member moved toward the second film member according to the first embodiment of the present invention.
Figure 12:
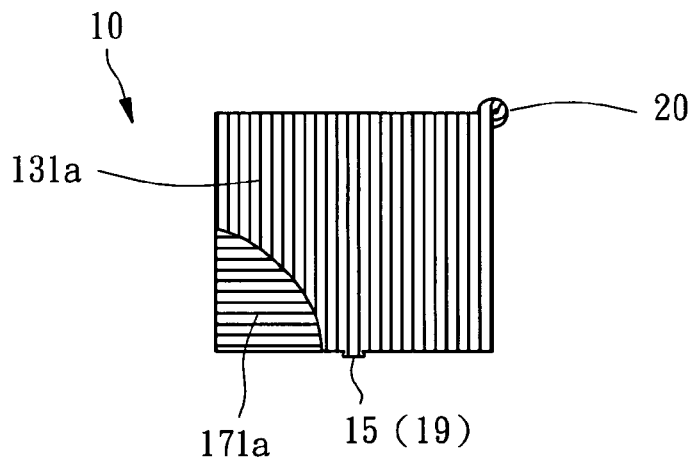
FIG. 12 is a partially cutaway drawing of the assembled optical film according to the first embodiment of the present invention.

Referring to FIG. 11, during the assembly process of the optical film 10, the connecting member 20 is worked as a pivot and the first and second structured surfaces 13 and 17 are maintained facing the same direction, and then the first film member 12 and the second film member 16 are turned relative to each other to have the second film member 16 be located below the first film member 12 and the protruding portions 15 and 19 be aligned with each other. At this time, the second structured surface 17 of the second film member 16 is attached to the first opposing surface 14 of the first film member 12, as shown in FIG. 12. Under this condition, the ridges 131a of the first film member 12 extend orthogonally across the ridges 171a of the second film member 16, the protruding portions 15 and 19 form a positioning device, and the twisted connecting member 20 form another positioning device. These positioning devices are used for positioning in the further assembly process.

If the worker has the two film members 12 and 16 arranged together in the wrong direction by a mistake, for example, if the first structured surface 13 is arranged facing the second structured surface 17, the protruding portions 15 and 19 will not be aligned, and the long sides and short sides of the two film members 12, 16 will also not be aligned. Therefore, the worker can quickly find the mistake and correct the error. If the two film members 12 and 16 are square film members of equal size, the worker needs only to check the alignment of the protruding portions 15 and 19 when arranged the film members 12 and 16 in a stack. Therefore, this design of optical film 10 enables the worker to check the correctness of the assembly procedure easily, improving the working efficiency.

Figure 13:
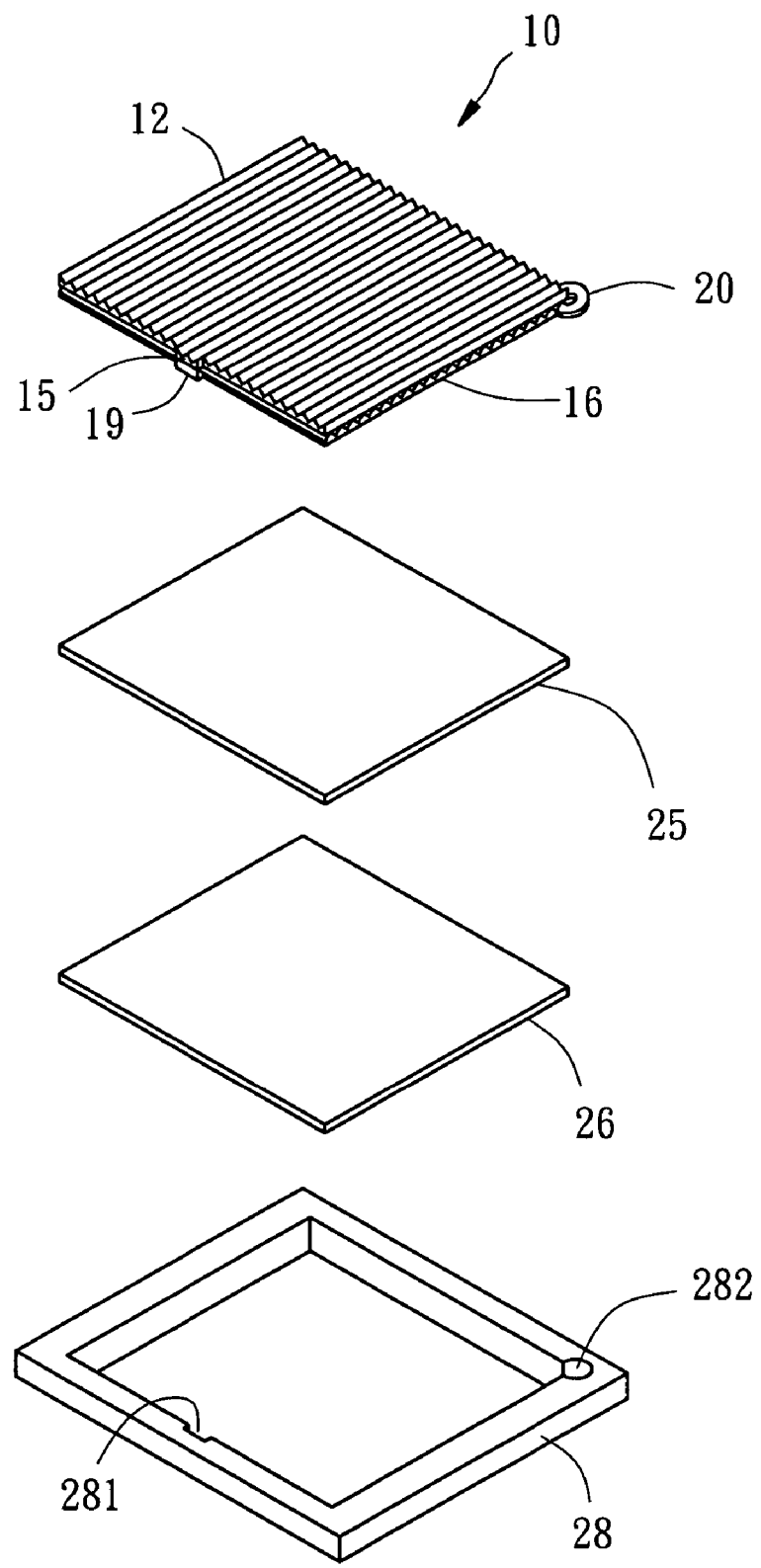
FIG. 13 is an exploded view of a backlight module in which the optical film of the first embodiment of the present invention is used.

Referring to FIG. 13, the optical film 10, i.e. the brightness enhancement film, with the diffuser 25 and the light guide plate 26 are mounted in a frame 20 properly. The frame 28 has a first positioning groove 281 and a second positioning groove 282. Because the diffuser 25 and the light guide plate 26 are not within the scope of the present invention, only the relationship between the optical film 10 and the frame 28 is described bellows.

Figure 14:
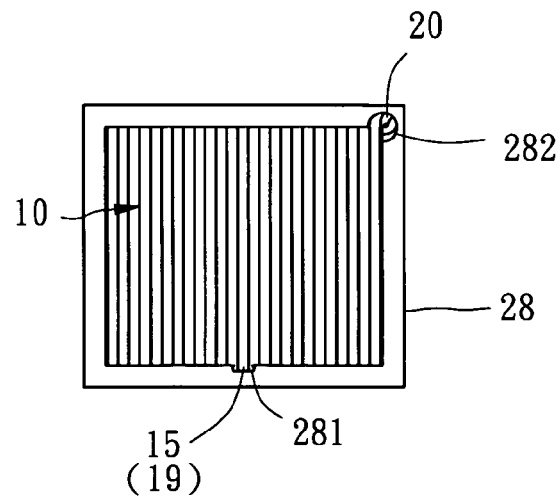
FIG. 14 is a schematic drawing showing the positioning status of the optical film of the first embodiment of the present invention in a backlight module frame.

The optical film 10 can be smoothly mounted in the frame 28 only when the first and second protruding portions 15 and 19 are inserted into the first positioning groove 281 and the connecting member 20 is inserted into the second positioning groove 282 as shown in FIG. 14, assuring that the structured surfaces of the optical film 10 are kept in the correct direction, i.e., the positioning device formed of the first and second protruding portions 15 and 19 and the positioning device formed of the twisted connecting member 20 help accurate installation of the optical film 10 in the frame 28, preventing an installation error.

Figure 15:
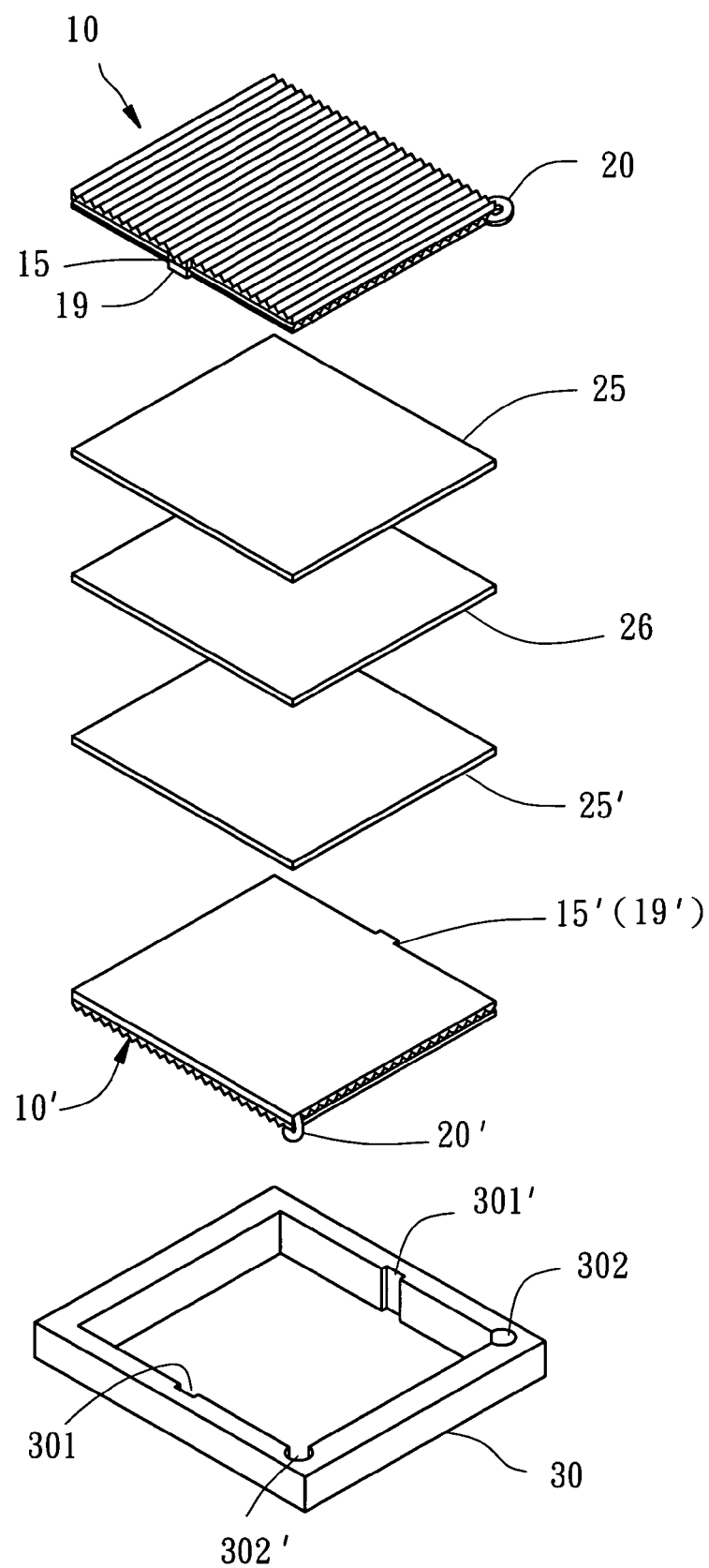
FIG. 15 is similar to FIG. 13, showing the optical film of the first embodiment of the present invention used in a dual screen optical display.

The aforesaid component parts are for use in a single-screen optical display. These component parts may be increased subject to actual application requirements, for example, two optical films 10 and 10' are used with two diffusers 25 and 25' and one light guide plate 26 for a dual screen optical display, as shown in FIG. 15. During installation, one diffuser 25 and one optical film 10 are arranged at one side of the light guide plate 26, the other diffuser 25' and the other optical film 10' are arranged at the opposing side of the light guide plate 26. For convenient installation of the optical films 10 and 10', the frame 30 has two first positioning grooves 301 and 301', two second positioning grooves 302 and 302'. The first positioning groove 301 and the second positioning groove 302 are for receiving the protruding portions 15 and 19 and the connecting member 20 of one optical film 10 respectively. The first positioning groove 301' and the second positioning groove 302' are for receiving the protruding portions 15' and 19' and the connecting member 20' of the other optical film 10' respectively.

Figure 16:
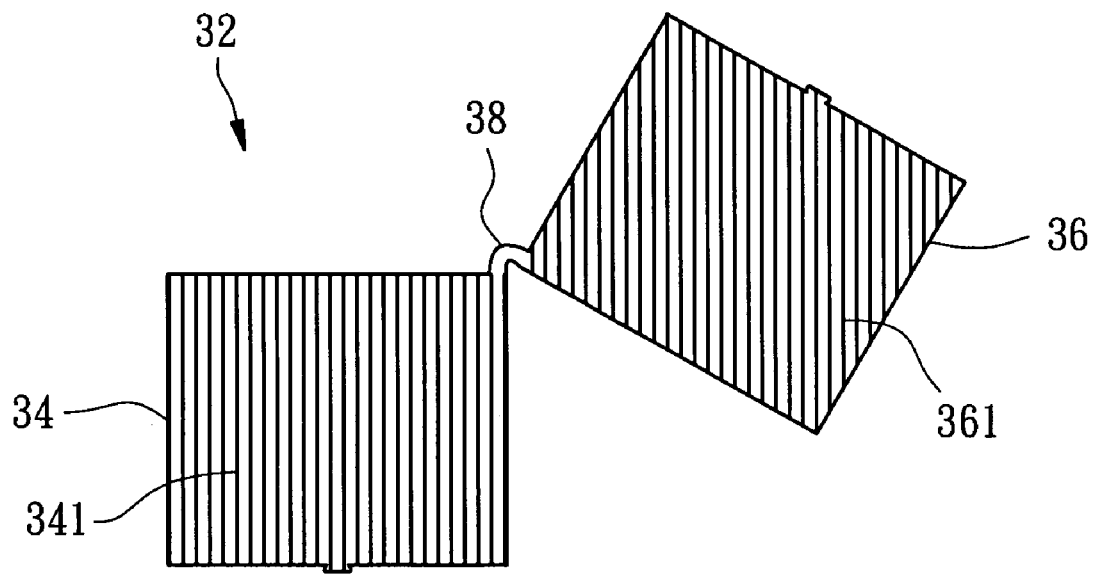
FIG. 16 is a schematic drawing showing the structure of an optical film according to a second embodiment of the present invention.
Figure 17:
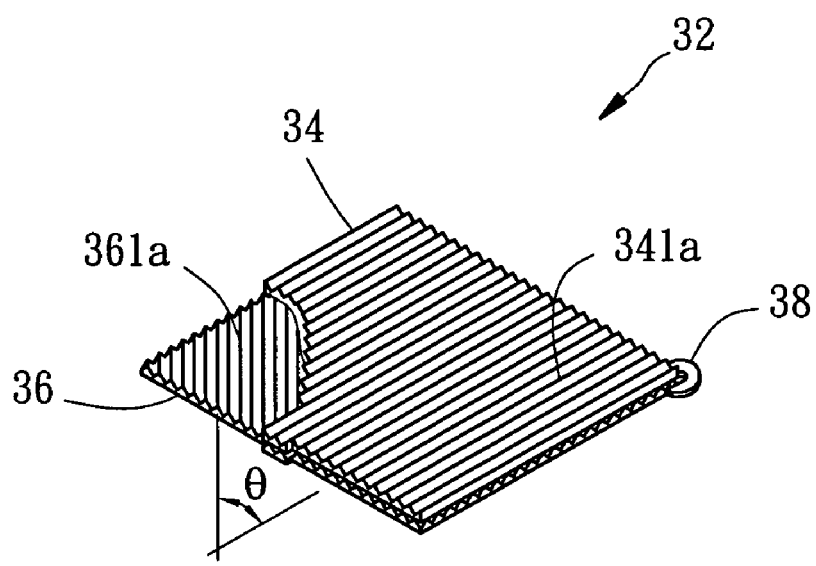
FIG. 17 is a partially cutaway drawing of the assembled optical film according to the second embodiment of the present invention.

FIG. 16 shows an optical film 32 according to the second embodiment of the present invention. The optical film 32 is directly cut from a material through one single cut, comprising a first film member 34, a second film member 36 and a connecting member 38 connected between and formed integral with the first film member 34 and the second film member 36. The first structured surface 341 of the first film member 34 and the second structural surface 361 of the second film member 36 face the same direction. Comparing with the aforesaid first embodiment shown in FIG. 3, this second embodiment has a different configuration; however, the installation procedure is the same, i.e., the connecting member 38 is worked as a pivot and the first and second structured surfaces 341 and 361 are maintained facing the same direction, and then the first film member 34 and the second film member 36 are turned relative to each other and arranged in a stack, as shown in FIG. 17. At this time, the ridges 341a of the first structured surface 341 of the first film member 34 define with the ridges 361a of the second film member 36 a contained angle θ, which is smaller than 90°.

FIGS. 18 and 19 show another application example of the present invention. As illustrated, an optical film set 40 formed of a fist optical film 50 and a second optical film 60 is used in a backlight module for dual screen display.

The first optical film 50 is directly cut from a material through one single cut, comprising a first film member 52, a second film member 54 and two connecting members 56 connected between and formed integral with the first film member 52 and the second film member 54. The first film member 52 has a first structured surface 521 and a first opposing surface 522. The second film member 54 has a second structured surface 541 and a second opposing surface 542. The first and second structured surfaces 521 and 541 each have a plurality of linear first or second prisms 523 or 543. The ridges 523a of the linear prisms 523 and the ridges 543a of the prisms 543 extend straightly in a parallel relationship.

The second optical film 60 is directly cut from a material through one single cut, comprising a third film member 62, a fourth film member 64 and two connecting members 66 connected between and formed integral with the third film member 62 and the fourth film member 64. The third film member 62 has a third structured surface 621 and a third opposing surface 622. The fourth film member 64 has a fourth structured surface 641 and a fourth opposing surface 642. The third and fourth structured surfaces 621 and 641 each have a plurality of linear third or fourth prisms 623 or 643. The ridges 623a of the third prisms 623 and the ridges 643a of the fourth prisms 643 extend straightly in a parallel relationship.

During installation of the optical film set 40 with the two diffusers 70 and the light guide plate 72, the light guide plate 72 is set between the two diffusers 70, and then the diffusers 70 with the light guide plate 72 are put in between the third film member 62 and forth film member 64 of the second optical film 60, and then the second optical film 60 is set in between the first film member 52 and second film member 54 of the first optical film 50. In order to fully carry out the light condensing effect of the optical film set 40, the ridges 523a and 543a of the first optical film 50 must not be kept in parallel to the ridges 623a and 643a of the second optical film 60. After installation of the component parts, the third structured surface 621 of the third film member 62 of the second optical film 60 faces the first opposing surface 522 of the first film member 52 of the first optical film 50; the ridges 623a of the third prisms 623 respectively define with the ridges 523a of the first prisms 523 a contained angle; the fourth structured surface 641 of the fourth film member 64 of the second optical film 60 faces the second opposing surface 542 of the second film member 54 of the first optical film 50; the ridges 643a of the fourth prisms 64 respectively define with the ridges 543a of the second prisms 543 a contained angle. The aforesaid contained angles are most preferably a 90° angle.

As indicated above, the second optical film 60 is sandwiched between the first and second film members 52 and 54 of the first optical film 50 during the installation of the optical film set 40. This installation procedure is quite simple, preventing an installation error.

Figure 20:
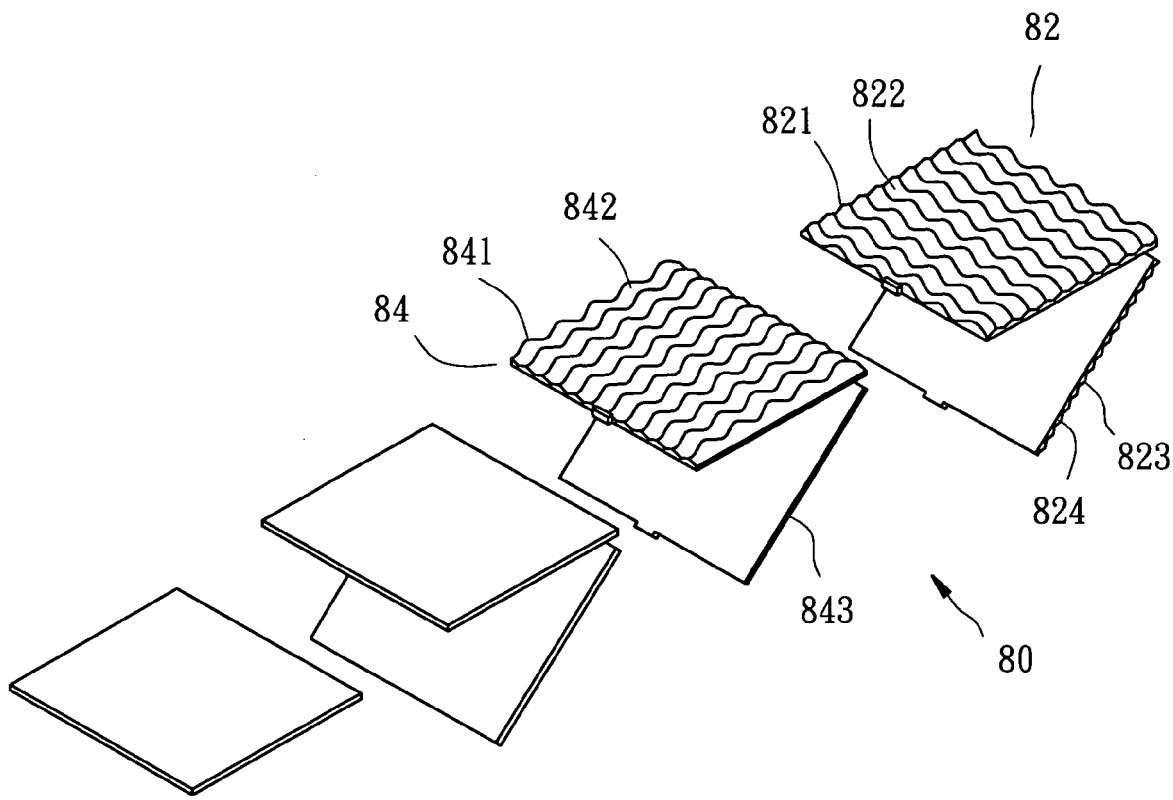
FIG. 20 corresponds to FIG. 19, showing the wavelike extending status of the prisms of the optical films.

FIG. 20 shows another optical film set 80 for use in a backlight module for dual screen display. The optical film set 80 comprises a first optical film 82 and a second optical film 84. The composition of the first optical film 82 and the second optical film 84 is substantially similar to the aforesaid optical film set 40 with the exception that the prisms of the optical film set 80 extend in a wavelike manner.

Figure 21:
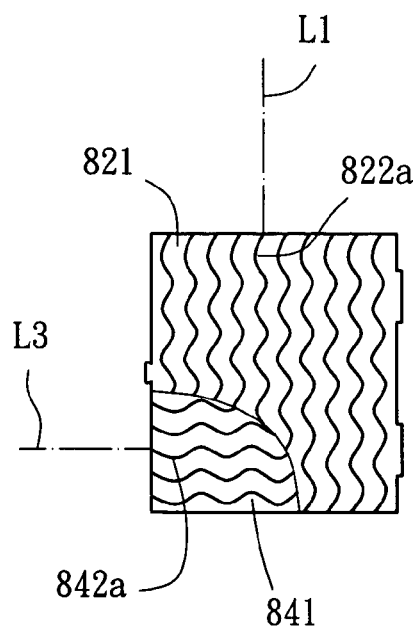
FIG. 21 is a partially cutaway drawing showing the relationship between the ridges of the first film member of the first optical film and the third film member of the second optical film according to the second embodiment of the present invention.
Figure 22:
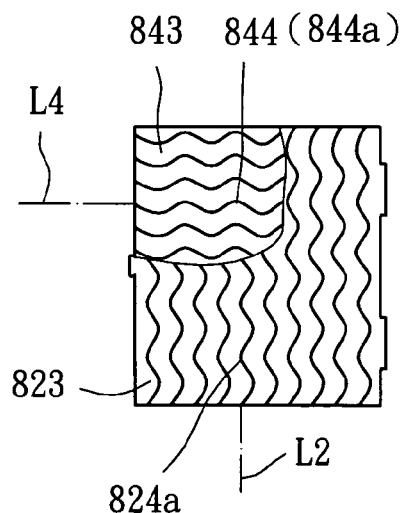
FIG. 22 is a partially cutaway drawing showing the relationship between the ridges of the second film member of the first optical film and the fourth film member of the second optical film according to the second embodiment of the present invention.

FIGS. 21 and 22 show the status after the first optical film 82 and the second optical film 84 have been arranged in a stack.

FIG. 21 shows the first film member 821 of the first optical film 82 abutted to the third film member 841 of the second optical film 84. Under this condition, the ridges 822a of the prisms 822 of the first film member 821 of the first optical film 82 extend along a first axial direction L1 in a wavelike manner, the ridges 842a of the prisms 842 of the third film member 841 of the second optical film 84 extend along a third axial direction L3 in a wavelike manner. The first axial direction L1 and the third axial direction L3 define a contained angle.

FIG. 22 shows the second film member 823 of the first optical film 82 abutted to the fourth film member 843 of the second optical film 84. Under this condition, the ridges 824a of the prisms 824 of the second film member 823 of the first optical film 82 extend along a second axial direction L2 in a wavelike manner, and the ridges 844a of the prisms 844 of the fourth film member 843 of the second optical film 84 extend along a fourth axial direction L4 in a wavelike manner. The second axial direction L2 and the fourth axial direction L4 define a contained angle.

The contained angle defined by the first axial direction L1 and the third axial direction L3 and the contained angle defined by the second axial direction L2 and the fourth axial direction L4 according to this embodiment are 90°. The working effect of this optical film set 80 is same as the optical film set 40.

Figure 23:
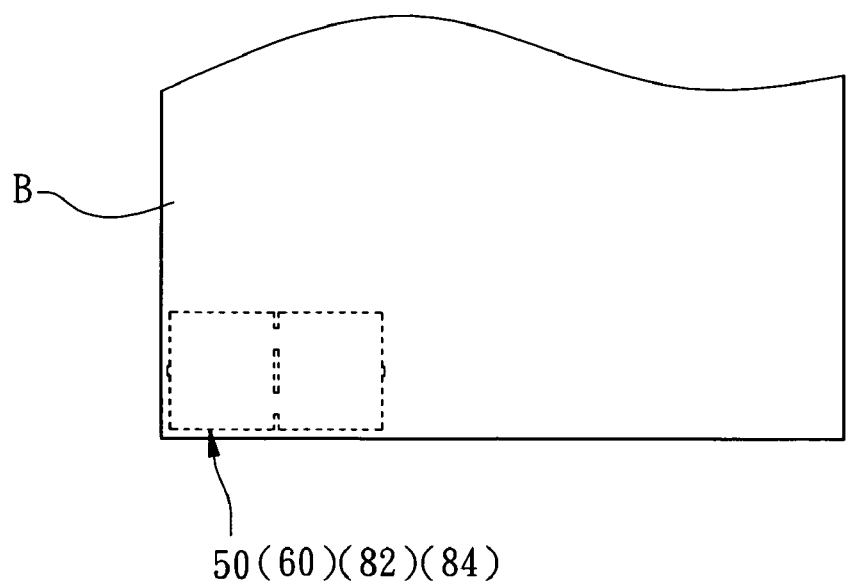
FIG. 23 is a schematic drawing showing one cutting example of an optical film from a material according to the present invention.
Figure 24:
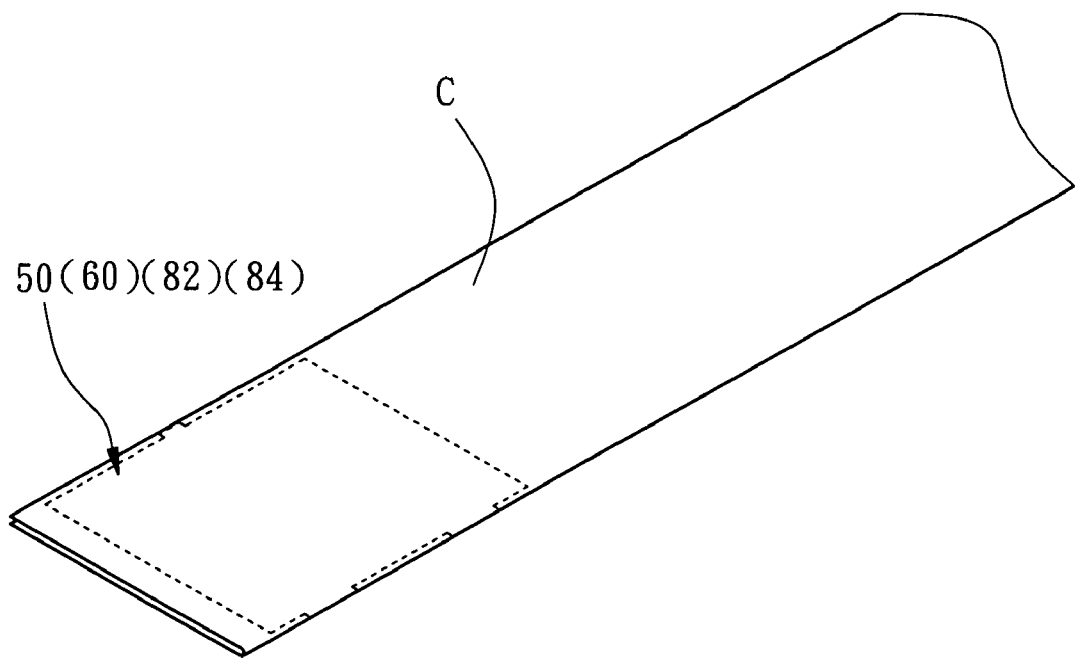
FIG. 24 is a schematic drawing showing another cutting example of an optical film from a material according to the present invention.

Referring to FIGS. 23 and 24, one single piece of material can be cut through one single cut to obtain the desired first optical film 50(82) or second optical film 60(84). The material B shown in FIG. 23 is kept in an extended status for cutting. The material C shown in FIG. 24 is folded up before cutting. During cutting, do not cut the connecting members so that the two optical films thus obtained are kept connected.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical film that is formed integrally, the optical film comprising:
   a first film member;
   a second film member; and
   a connecting member joining the first film member and the second film member;
   a frame including at least one positioning groove, and after the first and second film members are turned relative to each other, the connecting member defines a protruding portion engaged with the positioning groove.

2. The optical film as claimed in claim 1, wherein the first film member comprises a first structured surface and a first opposing surface, the first structured surface having a plurality of first optical structures thereon; the second film member comprises a second structured surface and a second opposing surface, the second structured surface having a plurality of second optical structures thereon.

3. The optical film as claimed in claim 2, wherein the first optical structures and the second optical structures are a plurality of prisms.

4. The optical film as claimed in claim 3, wherein the prisms are linear prisms having respectively ridges which straightly extend in a parallel manner.

5. The optical film as claimed in claim 3, wherein the prisms are linear prisms having respectively ridges which extend in a wavelike and neighbor manner.

6. An optical film comprising:
a first film member;
a second film member; and
a connecting member integrally joining the first film member and the second film member;
wherein the first film member has a first structured surface and a first opposing surface;
wherein the second film member has a second structured surface and a second opposing surface, the second film member being located below the first film member, the second structured surface being attached to the first opposing surface;
wherein the connecting member has a first end connected to the first film member and a second end connected to the second film member; and
a frame including at least one positioning groove, and after the first and second film members are turned relative to each other, the connecting member defines a protruding portion engaged with the positioning groove.

7. The optical film as claimed in claim 6, wherein the first structured surface of the first film member has a plurality of first prisms thereon; the second structured surface of the second film member has a plurality of second prisms thereon.

8. The optical film as claimed in claim 7, wherein the first prisms and the second prisms are linear prisms having respectively ridges which straightly extend, the extending direction of the ridges of the first prisms defining with the extending direction of the ridges of the second prisms a contained angle.

9. The optical film as claimed in claim 8, wherein the contained angle is in the range of 0°-90°.

10. The optical film as claimed in claim 7, wherein the first prisms are linear prisms having respectively ridges which extend along a first prism axis in a wavelike manner, and the second prisms are linear prisms having respectively ridges which extend along a second prism axis in a wavelike manner, the first prism axis defining with the second prism axis a contained angle.

11. The optical film as claimed in claim 10, wherein the contained angle is in the range of 0°-90°.

12. The optical film as claimed in claim 6, wherein at least one of the first film member and second film member has a protruding portion.

13. The optical film as claimed in claim 6, wherein the connecting member extends out of the first film member and the second film member.

14. An optical film set for use in a dual screen display, the optical film set comprising a first optical film that is formed integrally and a second optical film that is formed integrally;
wherein the first optical film comprises a first film member having a first structured surface and a first opposing surface, a second film member having a second structured surface and a second opposing surface, and a connecting member joining the first film member and the second film member;
wherein the second optical film comprises a third film member having a third structured surface that is attached to the first opposing surface of the first film member and a third opposing surface, a fourth film member having a fourth structured surface that is attached to the second opposing surface of the second film member and a fourth opposing surface, and a connecting member joining the third film member and the fourth film member.

15. The optical film set as claimed in claim 14, wherein the first structured surface of the first film member comprises a plurality of first prisms, and the third structured surface of the third film member comprises a plurality of third prisms.

16. The optical film set as claimed in claim 15, wherein the first prisms and the third prisms are linear having respectively ridges which straightly extend, the extending direction of the ridges of the first prisms defining with the extending direction of the ridges of the third prisms a contained angle.

17. The optical film set as claimed in claim 15, wherein the first prisms are linear prisms having respectively ridges which extend along a first prism axis in a wavelike manner, and the third prisms are linear prisms having respectively ridges which extend along a third prism axis in a wavelike manner, the first prism axis defining with the third prism axis a contained angle.

18. The optical film set as claimed in claim 14, wherein the second structured surface of the second film member comprises a plurality of second prisms, and the fourth structured surface of the fourth film member comprises a plurality of fourth prisms.

19. The optical film set as claimed in claim 18, wherein the second prisms and the fourth prisms are linear prisms having respectively ridges which straightly extend, the extending direction of the ridges of the second prisms defining with the extending direction of the ridges of the fourth prisms a contained angle.

20. The optical film set as claimed in claim 18, wherein the second prisms are linear prisms having respectively ridges which extend along a second prism axis in a wavelike manner, and the fourth prisms are linear prisms having respectively ridges which extend along a fourth prism axis in a wavelike manner, the second prism axis defining with the fourth prism axis a contained angle.

21. An optical film that is formed integrally, the optical film comprising:
a first film member comprising a first structured surface and a first opposing surface, the first structured surface having a plurality of first optical structures thereon;
a second film member comprising a second structured surface and a second opposing surface, the second structured surface having a plurality of second optical structures thereon;
wherein the first optical structures and the second optical structures are a plurality of prisms;
a connecting member joining the first film member and the second film member; and
a frame including at least one positioning groove, and after the first and second film members are turned relative to each other, the connecting member defines a protruding portion engaged with the positioning groove.

22. An optical film set for use in a dual screen display, the optical film set comprising a first optical film that is formed integrally and a second optical film that is formed integrally;
wherein the first optical film comprises a first film member having a first structured surface and a first opposing surface, a second film member having a second structured surface and a second opposing surface, and a connecting member joining the first film member and the second film member;
wherein the second optical film comprises a third film member having a third structured surface that is attached to the first opposing surface of the first film member and a third opposing surface, a fourth film member having a fourth structured surface that is attached to the second opposing surface of the second film member and a fourth opposing surface, and a connecting member joining the third film member and the fourth film member; and
a frame including at least one positioning groove, and after the first and second film members are turned relative to each other, the connecting member defines a protruding portion engaged with the positioning groove.

* * * * *